(12) United States Patent
Seth et al.

(10) Patent No.: US 8,886,585 B1
(45) Date of Patent: Nov. 11, 2014

(54) SEARCH SUGGESTIONS BASED ON VIEWPORT CONTENT

(71) Applicant: Google Inc., Mountain View, CA (US)

(72) Inventors: Rohan Seth, San Francisco, CA (US); Joshua J. Sacks, San Carlos, CA (US); Michele Covell, Palo Alto, CA (US); Michael Chu, Los Altos Hills, CA (US); Shumeet Baluja, Mountain View, CA (US); David Marwood, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/070,463

(22) Filed: Nov. 1, 2013

Related U.S. Application Data

(63) Continuation of application No. 13/153,094, filed on Jun. 3, 2011, now Pat. No. 8,583,579.

(51) Int. Cl.
*G06N 5/02* (2006.01)
*G06F 7/00* (2006.01)
*G06Q 30/02* (2012.01)

(52) U.S. Cl.
CPC .................................. *G06Q 30/0251* (2013.01)
USPC ............................................ 706/46; 707/705

(58) Field of Classification Search
CPC .............................. G06Q 30/02; G06N 3/006
See application file for complete search history.

(56) References Cited

U.S. PATENT DOCUMENTS

| | | | |
|---|---|---|---|
| 6,834,195 B2 * | 12/2004 | Brandenberg et al. | 455/456.3 |
| 7,974,714 B2 | 7/2011 | Hoffberg | |
| 8,209,344 B2 | 6/2012 | Ramer et al. | |
| 2010/0241507 A1 * | 9/2010 | Quinn et al. | 705/14.42 |
| 2010/0318507 A1 | 12/2010 | Grant et al. | |
| 2012/0054302 A1 | 3/2012 | Priyadarshan et al. | |

* cited by examiner

*Primary Examiner* — Alan Chen
(74) *Attorney, Agent, or Firm* — McDermott Will & Emery LLP

(57) ABSTRACT

A method and computer program product for providing content to a user or computing device is disclosed. A plurality of operating modes for a computing device are identified based on usage information generated for the computing device over one or more periods of time. A request for content to display at the computing device is received, and the computing device is determined to be operating in at least one of the operating modes. User targeting information for the at least one of the operating modes is determined based on at least a portion of the usage information, and content for display at the computing device is provided based on the targeting information for the at least one of the operating modes.

20 Claims, 4 Drawing Sheets

SEARCH SUGGESTIONS BASED ON VIEWPORT CONTENT

CROSS-REFERENCE TO RELATED APPLICATIONS

The present application is a continuation of U.S. patent application Ser. No. 13/153,094 entitled "Targeting Based on User Mode," filed on Jun. 3, 2011, the disclosure of which is hereby incorporated by reference in its entirety for all purposes.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through an auction. For example, content sponsors can provide bids specifying amounts that the sponsors are respectively willing to pay for presentation of their content. In turn, an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing content to a user based on a mode of the user. The method includes: identifying a user for targeting content; evaluating usage information for the user to determine targeting information for a plurality of modes associated with the user; receiving a request to deliver content to the user including an identifier associated with the user and information to determine which mode of the plurality of modes the user is operating in; and providing content to the user based on the mode and associated targeting information.

In general, another aspect of the subject matter described in this specification can be implemented in a system for providing content to a user based on a mode of the user. The system includes an identification engine that identifies a user for targeting content. The system includes an evaluation engine that evaluates usage information for the user to determine targeting information for a plurality of modes associated with the user. The system includes a content management engine that receives a request to deliver content to the user including an identifier associated with the user and information to determine which mode of the plurality of modes the user is operating in and provides content to the user based on the mode and associated targeting information.

In general, another aspect of the subject matter described in this specification can be implemented in a computer program product in a tangible medium that when executed by a processor causes the processor to perform operations. The operations include identifying a user for targeting content, evaluating usage information for the user to determine targeting information for a plurality of modes associated with the user, receiving a request to deliver content to the user including an identifier associated with the user and information to determine which mode of the plurality of modes the user is operating in, and providing content to the user based on the mode and associated targeting information.

These and other implementations can each optionally include one or more of the following features. The usage information can be derived from a query log. The usage information can be derived from advertisement logs. The usage information can be derived from requests for content. The plurality of the modes can include a home mode, an away mode, and a work mode. The modes can be associated with a predetermined time of day or a location associated with the user when generating the request. Determining a mode associated with the user can include determining that the user is in a home mode if the user is at a location associated with a home of the user and the request is received during a predetermined time window during the day or night. Determining a mode associated with the user can include determining that the user is in a work mode if the user is at a work location associated with the user and the request is received during a predetermined time window during the day or night. Determining a mode associated with the user can include determining that the user is in an away mode if, at the time of receipt of the request, the user is not at a work location or a home location associated with the user. A home location can be attributed to a user based at least in part on the usage information. A work address associated with the user can be attributed to the user based at least in part on the usage information. A cookie can be stored on a user device associated with the user, and the user device can be associated with one of the locations associated with the user. Receiving the request and the identifier can include receiving the cookie from a device that was used to provide the request by the user. The information to determine which mode of the plurality of modes the user is operating in can include information relating to a time of the request, the location of request, or both. The targeting information for each mode can be based on historical user activities of the user when in a respective mode. The targeting information can be based on a location associated with a respective mode. The targeting information can be different for different modes. The mode can be based at least in part on an IP (Internet Protocol) address associated with a requesting device. An IP address associated with a request can be geocoded to determine a location of the user. Targeting information can be developed for each mode based on the usage information.

Particular implementations may realize one or more of the following advantages. Content can be provided to a user based on a current mode of the user. Content can be provided to a user based on the current mode of the user based on historical activities of the user when previously in that mode. Content can be provided to a user that has relevance to the current time and/or the current location of the user. Content that is relevant to a user's home or work can be provided to the user when the user is at home or work, respectively. Content that is relevant to a user's traveling can be provided to the user when the user is traveling.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of the user cannot be determined.

Content can be delivered to a user based at least in part on a mode that is associated with a user. For example, a user's Internet usage or other usage may be tracked. In some implementations, a cookie or other identifier can be used to identify a user and user activities associated with the user can be stored. Usage information can be evaluated for a user to determine/identify a plurality of modes associated with the user. Modes can include, for example, home, work, and away modes. Targeting information can be developed for a user and for a mode based on user activity of the user while in the mode. A request can be received to deliver content to the user, where the request includes an identifier associated with the user and information to determine which of the modes of the plurality of modes the user is operating in. Content can be provided to the user based on the mode the user is operating in and on associated targeting information. For example, content can be provided to the user operating in a work mode based on work-related targeting information developed from past user activities performed by the user when in the work mode.

Figure 1:
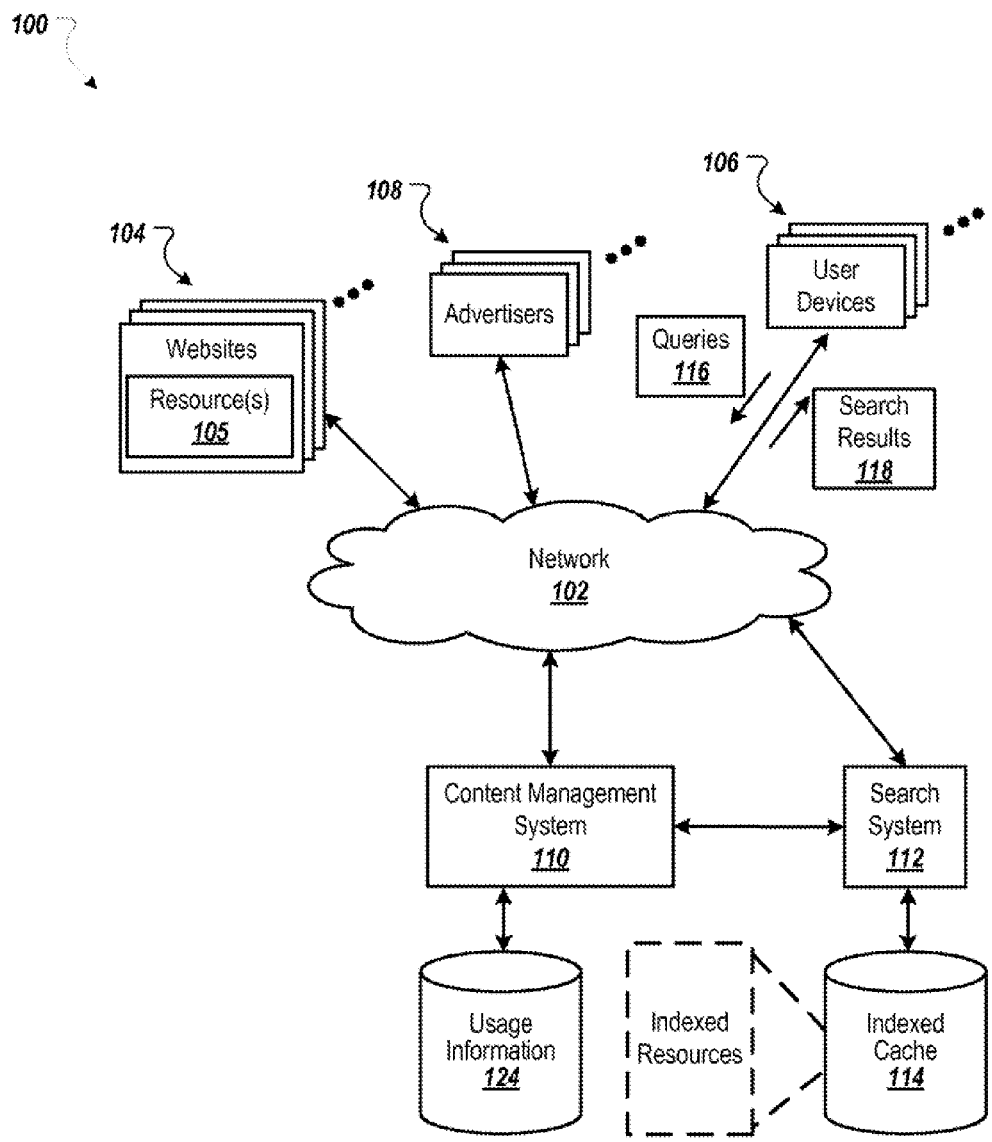
FIG. 1 is a block diagram of an example environment for providing content to a user based on a mode of the user.

FIG. 1 is a block diagram of an example environment 100 for providing content to a user based on a mode of the user. The example environment 100 includes a network 102, such as a local area network (LAN), a wide area network (WAN), the Internet, or a combination thereof. The network 102 connects websites 104, user devices 106, content providers (e.g., advertisers 108), publishers, and a content management system 110. The example environment 100 may include many thousands of websites 104, user devices 106, and content providers (e.g., advertisers 108). The content management system 110 may be used for selecting and providing content in response to requests for content.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, images and sounds, that may include embedded information (such as meta-information hyperlinks) and/or embedded instructions (such as JavaScript scripts).

To facilitate searching of resources 105, the environment 100 can include a search system 112 that identifies the resources 105 by crawling and indexing the resources 105 provided by the content publishers on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. User devices 106 can also submit search queries 116 to the search system 112 over the network 102. A request for a resource 105 or a search query 116 sent from a user device 106 can include an identifier, such as a cookie, identifying the user of the user device 106.

In response to a search query 116, the search system 112 can access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The content information system 110 can update usage information 124 for a user, based on activity of the user. The usage information 124 can include, for example, information about past user activities, such as past requests for resources 105, past search queries 116, other requests for content, web sites visited, or interactions with content. In some implementations, the usage information 124 can be derived, for example, from one or more of a query log, an advertisement log, or requests for content. In some implementations, the usage information 124 can include, for each entry, a cookie identifying the user, a timestamp, an IP (Internet Protocol) address associated with a requesting user device 106, a type of usage, and details associated with the usage.

The content management system 110 can evaluate usage information 124 to determine targeting information for a plurality of modes associated with a user. The plurality of modes associated with the user can include, for example, a home mode, a work mode, and an away mode (e.g., travel mode). One or more modes in the plurality of modes can be associated with one or more predetermined time specifications or time windows. For example, a work mode can be associated with a time range often A.M. to five P.M. on the week days of Monday through Friday, where usage information 124 for usage occurring during such times can be associated with the work mode. As another example, a home mode can be associated with a time range of seven P.M. to seven A.M. on the week days of Monday through Friday and all day on Saturday and Sunday, where usage information 124 for usage occurring during such times can be associated with the home mode. One or more modes can be associated with one or more predetermined locations. For example, requests that originate from a specified location (e.g., from a home, from a location associated with a user's work) can be attributed/associated with a particular mode. The mode of the user can be determined based on user actions, user location, time (e.g., of day, or of year), user specification (e.g., the user specifies the mode that he/she is operating in), or can be inferred by one or more current or past actions of the user. In some implementations, a user may be determined to be operating in plural modes (e.g., working from home). In some implementations, where the content management system 110 determines that two or more modes are associated with a current user then a determination of a dominant mode can be made (e.g., working from home may resolve to a determination of a work mode as being a dominant mode of operation). Alternatively, targeting of content can be performed based on a combination of the targeting criteria for the two or more modes. In some implementations, targeting where two or more modes are determined can be made on an alternating basis.

In some implementations, the content management system 110 may group the usage information 124 by user and by IP address and may associate a home mode, a work mode, or some other mode with each usage information entry, based, for example, on a date and time stamp included in the entry. Each IP address may be geo-coded, such as to determine an approximate location associated with the IP address. In some implementations, the content management system 110 may determine, for each user, an IP address associated with the user that most corresponds to a work mode or to a home mode as compared to other IP addresses associated with the user. A user's home or work location may be approximated by geo-coding the home IP address or work IP address, respectively.

Targeting information may be developed, for each user, for each mode associated with the user, where the targeting information may be different for the user for each mode. Targeting information may be developed, for example, for each user, for each mode, based on the usage information 124. For example, for a particular user, work-related targeting information may be developed from usage information 124 associated with a work mode and home-related targeting information may be developed from usage information 124 associated with a home mode. In general, targeting information may be developed, for each user and for each mode, based on historical user activities of the user when in the respective mode. For example, search keywords used, particular content interacted with, sites visited by the user, etc., may be used to develop targeting information. Targeting information for a user for a particular mode can indicate concepts associated with that mode or things that the user is interested in while in that mode. Targeting information for a user and for a particular mode can be stored in the usage information 124.

When a resource 105 or search results 118 are requested by a user device 106, the content management system 110 may receive a request for content to be provided with the resource 105 or search results 118. The request for content can include characteristics of one or more "slots" that are defined for the requested resource 105 or search results page. For example, the data representing the resource 105 can include data specifying a portion of the resource 105 or a portion of a user display, such as a presentation location of a pop-up window or a slot of a third-party content site or web page, in which content can be presented. An example slot is an ad slot. Search results pages can also include one or more slots in which other content items (e.g., ads) can be presented.

Information about slots can be provided to the content management system 110. For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

A request for a resource 105 or a search query 116 can also include an identifier (e.g., cookie) associated with the user and information to determine which mode of the plurality of modes the user is operating in. In some implementations, a mode associated with the request may be determined based on information relating to a time of the request. the location of the request, or both. For example, a home or a work mode may be determined if the location of the request matches a location associated with the home or work of the user and the request is received during a predetermined home or work related time window during the day or night, respectively. An away, or travel mode may be determined if, at the time of receipt of the request, the user is not at a work location or a home location associated with the user.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, content items having targeting keywords that match the resource keywords or the search query 116 are selected as eligible content items by the content management system 110. As another example, content may be selected based on targeting keywords that are associated with the user and with the mode the user is operating in.

A targeting keyword can match a resource keyword or a search query 116 by having the same textual content ("text") as the resource keyword or search query 116. For example, an ad associated with the targeting keyword "hotels" can be an eligible content item (or an eligible ad) for an ad request that includes the resource keyword "hotels." Similarly, the ad can be selected as an eligible content item for an ad request including the search query "hotels."

The content management system 110 can select from the eligible content items that are to be provided for presentation in slots of a resource 105 or search results page 118 based at least in part on results of an auction. For example, for the eligible content items, the content management system 110 can receive bids from content providers (e.g., advertisers 108) and allocate the slots, based at least in part on the received bids (e.g., based on the highest bidders at the conclusion of the auction). The bids are amounts that the content providers are willing to pay for presentation (or selection) of their content with a resource 105 or search results page 118. For example, a bid can specify an amount that a content provider is willing to pay for each 1000 impressions (i.e., presentations) of the content item, referred to as a CPM bid. Alternatively, the bid can specify an amount that the content provider is willing to pay for a selection (i.e., a click-through) of the content item or a conversion following selection of the content item. The selected content item can be determined based on the bids alone, or based on the bids of each bidder being multiplied by one or more factors, such as quality scores derived from content performance, landing page scores, and/or other factors. In some implementations, a content provider can bid based on a mode of the user. For example, a content provider can bid on content to be presented to a home user, a work user, a user who is traveling, or a user who is traveling to a particular location.

Figure 2:
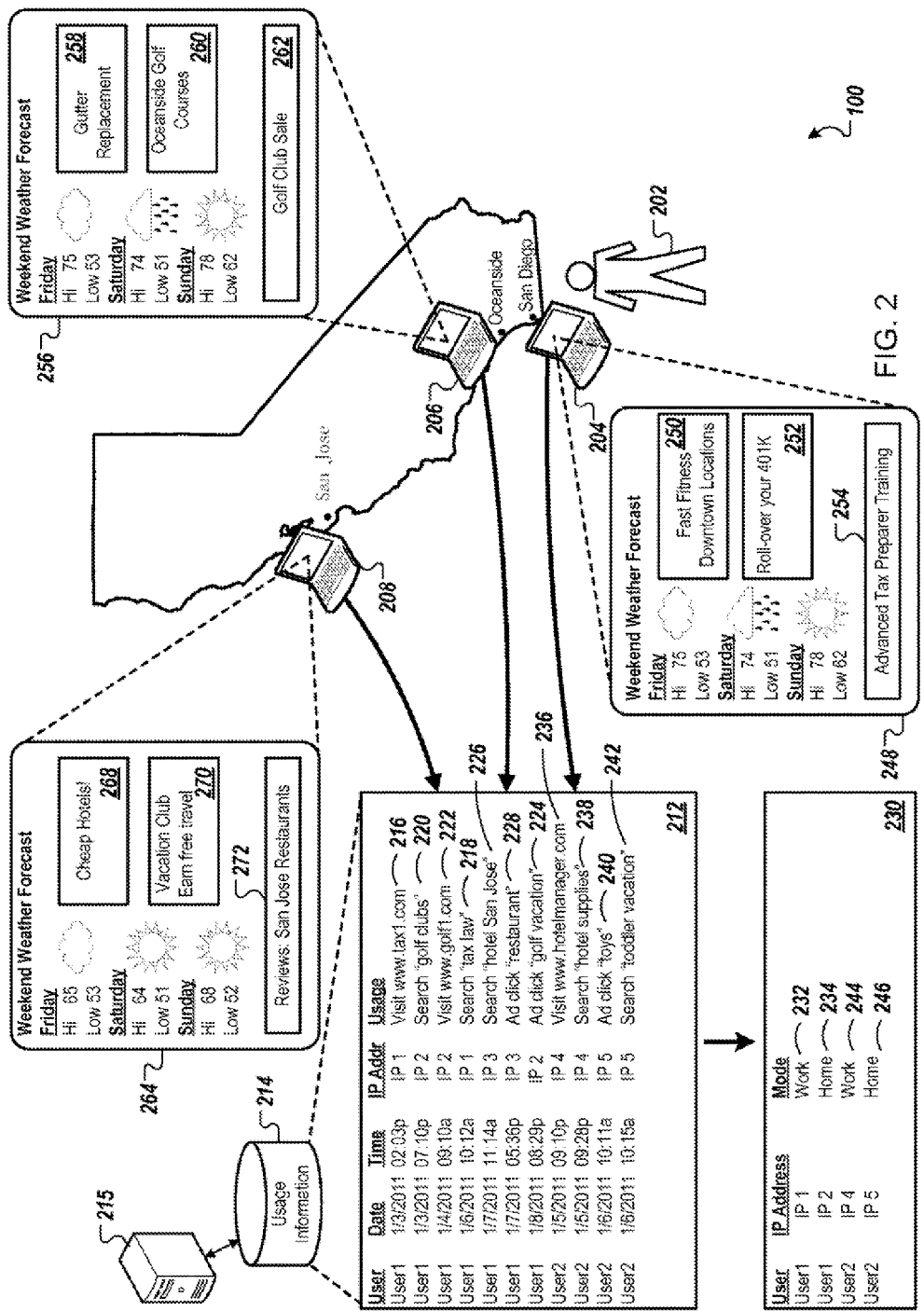
FIG. 2 illustrates a block diagram of an example system for providing content to a user based on a user mode.

FIG. 2 illustrates a block diagram of an example system 200 for providing content to a user based on a user mode. A user 202 works at an accounting firm in San Diego, Calif., and uses a user device 204 to request content, such as over the Internet or some other network. The user 202 lives in Oceanside, Calif. The user 202 may use the user device 204 to request content while at home, as illustrated by a user device 206. The user 202 periodically travels to San Jose, Calif. for work, and may use the user device 204 to request content while in San Jose, as illustrated by a user device 208. The user 202 occasionally travels to other destinations and may use the user device 204 while at those locations.

Over time, usage information, including requests for content, is stored for the user 202. For example, the user may be identified (e.g., by an identification engine (not shown) using cookies to identify particular users) and usage information 212 may be developed based on one or more actions taken by the user. In some implementations, the usage information 212 may be stored in a database 214 accessible by a server 215. The server 215 may be, for example, the content management system 110 described above with respect to FIG. 1. The usage information 212 may include, for each recorded usage, a user identifier (e.g., a cookie), a date and time stamp, an IP address associated with a requesting device, and information describing the usage.

For example, an entry 216 includes an identifier of "User1" (e.g., "User1" may be the user 202), a date and time stamp of "1/3/2011 2:03 PM", an IP address of "IP 1" (e.g., the "IP 1" address may be associated with the user device 204 when the user device 204 is used by the user 202 when at work in San Diego), and a description of usage indicating that the user 202 visited a "www.tax1.com" web site.

The usage information 212 may be evaluated (e.g., by an evaluation engine (not shown)) and each entry may be associated with one of a plurality of modes. Modes may include, for example, work, home, and away modes. In some implementations, an entry may be associated with a particular mode based on the time of request being received during a predetermined time window that is associated with the mode. For example, the entry 216 may be associated with a work mode based on the time of requesting occurring during a work day. Similarly, an entry 218 may be associated with the work mode because the time of the associated request is mid-morning on a work day.

The "IP 1" address may be identified as a work IP address for the user 202, for example, based on the "IP 1" address being associated with more work-mode related entries than any other IP address associated with the user 202. The identifying of the "IP 1" address as a work-related address for the user 202 may be stored. For example, database information 230 includes an entry 232 which specifies that "IP 1" is a work-related address for the user 202.

Other usage information, such as entries 220, 222, and 224, which are each associated with an "IP 2" address (e.g., the "IP 2" address may be associated with the home of the user 202 in Oceanside), may each be associated with a home mode due to an associated request being received either on a weekend (e.g., the entry 222) or during evening hours (e.g., the entries 220 and 224). The "IP 2" address may be identified as a home IP address for the user 202, for example, based on the "IP 2" address being associated with more home-mode related entries than any other IP address associated with the user 202. An entry 234 in the database information 230 specifies that the "IP 2" address is a home-related address for the user 202.

Although usage information may be associated as being work-related or home-related based on time-of-day information, other approaches may be used to associate a mode with usage information. For example, user activities may be evaluated, and a determination of a work mode or a home may be based on the types of user activities. For example, usage information entries 236-242 are associated with a "user 2" user (e.g., a user different than the user 202). The "user 2" user may, for example, work second shift as a hotel manager and may be at home during first shift.

The entries 236 and 238 each occur during weekday evenings, are associated with an "IP 4" address, and are user activities related to hotel management. The entries 240 and 242 each occur during the day on weekdays, are associated with an "IP 5" address, and are user activities related to children. The server 215 may evaluate the entries 236-242 for the "user 2" user and may determine that the "IP 4" address is a work-related IP address based on the "IP 4" address being associated with more work-related user activities than other IP addresses associated with the "user 2" user. Similarly, the server 215 may determine that the "IP 5" address is a home-related address based on the "IP 5" address being associated with more home-related (e.g., non-work related) user activities than other IP addresses associated with the "user 2" user. Entries 244 and 246 in the database information 230 specify that the "IP 4" and "IP 5" addresses are a work-related IP address and a home-related IP address, respectively, for the "user 2" user.

Targeting information may be developed (e.g., by the server 215) for a user for each mode associated with the user. Targeting information for a particular mode for a user may include targeting information that is generally applicable to all users for that mode (e.g., targeting information generally applicable to home users or work users) or targeting information specific to the user and to the mode based on historical activities of the user while in that mode. For example, the usage information 212 indicates a tendency for the user 202 to perform tax related user activities while in a work mode and to perform golf related user activities while in a home mode, therefore tax related targeting information may be associated with the work mode and with the user 202 and golf related targeting information may be associated with the home mode and with the user 202.

When a subsequent request for content is received from a user (e.g., the user 202 or the "user 2" user), a current mode that the user is operating in is determined. For example, the server 215 can determine a current mode based on information relating to a time of the request, the location of the request, or both. For example, if the user 202 submits a request to view a weekend weather forecast using the device 204 (e.g., when at work in San Diego), the request may be associated with the user 202 (e.g., using a cookie) and also with the "IP 1" address included in the request. The server 215 can determine that the weather forecast request is being made while the user is in a work mode based on the "IP 1" address matching the work-related entry 232 and/or based on the user 202 requesting the weather forecast during work hours.

As another example, if the user 202 submits a request to view a weekend weather forecast using the device 206 (e.g., when at home in Oceanside), the request may be associated with the "IP 2" address included in the request and the server 215 can determine that the request is being made while the user 202 is in a home mode based on the "IP 2" address matching the home-related entry 234 or based on a time of request being included in a time window associated with the home mode.

A travel mode (e.g., away mode) can also be determined for a received request. For example, entries 226 and 228, which are each received from an "IP 3" address (e.g., the "IP 3" address may be associated with the San Jose location), may each be associated with a travel mode. For example, when a request associated with the entry 226 or the entry 228 is received, the server 215 may determine that the "IP 3" address is different than both the "IP 1" address previously identified as the work-related IP address and the "IP 2" address previously identified as the home-related IP address. The "IP 3" address may be geocoded to determine a location associated with the "IP 3" address. The "IP 1" and "IP 2" addresses may also be geocoded, if they have not been previously geocoded. If the difference between the user's current location and their home and work locations is greater than a threshold distance (e.g., one hundred miles), it may be determined that the user 202 is traveling and that the received request is associated with a travel mode.

When a mode (e.g., home, work, travel) is determined for a request, content may be provided to the user 202 based on targeting information associated with the user 202 and with the mode. For example, in response to a request by the user 202 for a weekend weather forecast, the server 215 may select one or more content items to provide to the user 202 with the weather forecast, based on previously determined targeting information for the user 202 and the mode.

For example, a user interface 248 is displayed on the user device 204 in response to the user 202 requesting a weather forecast while in a work mode. The user interface includes content items 250, 252 and 254 that have been selected based on targeting information associated with the user 202 and with the work mode. The content item 250 may be selected, for example, based on being of interest to working professionals in San Diego. The content item 252 may be selected, for example, based on being generally of interest to work users. The content item 254 may be selected, for example, based on past activities of the user 202 while in the work mode.

As another example, a user interface 256 is displayed on the user device 206 in response to the user 202 requesting a weather forecast while in a home mode. The user interface 256 includes content items 258, 260, and 262 that have been selected based on targeting information associated with the user 202 and with the home mode. The content item 258 may be selected, for example, based on being a content item generally of interest to home users. The content item 260 may be selected, for example, based on the location of the request (e.g., Oceanside) and based on past activities of the user while in the home mode. The request 262 may be selected, for example, based on past activities of the user while in the home mode.

A user interface 264 may be displayed on the user device 208, for example, in response to the user 202 requesting a weather forecast while traveling in San Jose. The user interface 264 includes content items 268, 270, and 272 that have been selected based on targeting information associated with the user 202 and with a traveling (e.g., away) mode. The content items 268 and 270 may be selected, for example, based on generally being of interest to travelers. The content item 272 may be selected based on being of interest to travelers traveling to San Jose.

Figure 3:
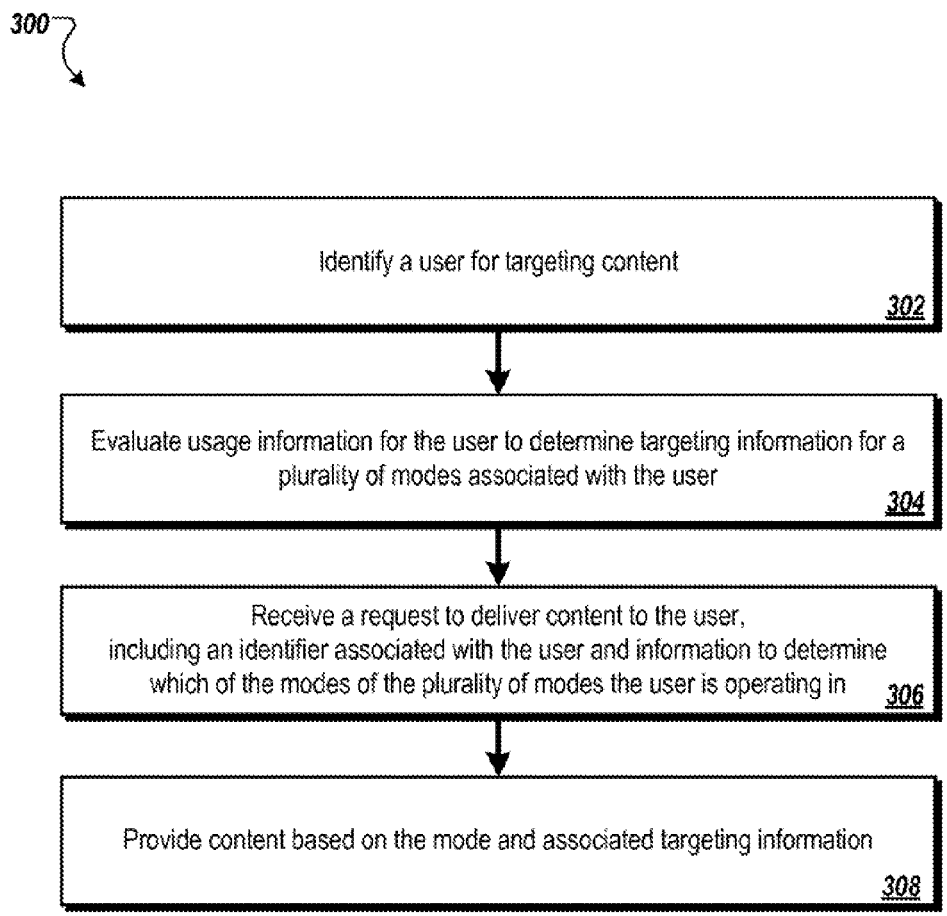
FIG. 3 is a flowchart of an example process for providing content to a user based on a mode of the user.

FIG. 3 is a flowchart of an example process 300 for providing content to a user based on a mode of the user. The process 300 can be performed, for example, by the content management system 110 described above with respect to FIG. 1 or the server 215 described above with respect to FIG. 2.

A user is identified for targeting content (302). For example, a user identifier, such as a cookie, can be used to identify the user. A cookie can, for example, uniquely identify a user using a particular device. A cookie can be stored on a user device and can be included in a request for content received from a user device.

Usage information for the user is evaluated to determine targeting information for a plurality of modes associated with the user (304). The usage information can be derived, for example, from one or more of a query log, an advertisement log, or requests for content. In some implementations, the usage information can include, for each entry, a cookie identifying the user, a timestamp, an IP address associated with a requesting device, a type of usage, and details associated with the usage. Usage types can include a search query, a web site visit, a user interaction with one or more content items, or a conversion, to name a few examples.

The plurality of modes associated with the user can include, for example, a home mode, a work mode, and an away mode (e.g., travel mode). One or more modes in the plurality of modes can be associated with one or more predetermined time specifications. For example, a mode can be associated with one or more days of the week, and for each day of the week, one or more time ranges. For example, a work mode can be associated with a time range of ten A.M. to five P.M. on the week days of Monday through Friday, where usage information for usage occurring during such times can be associated with the work mode. As another example, a home mode can be associated with a time range of seven P.M. to seven A.M. on the week days of Monday through Friday and all day on Saturday and Sunday, where usage information for usage occurring during such times can be associated with the home mode.

Although a work mode and a home mode are described, other modes are possible. For example, a work lunch hour mode can be associated with a time range of eleven A.M. to one P.M. on the weekdays of Monday through Friday. Other examples include a dinner mode (e.g., five P.M. to seven P.M.), a before-dinner mode (e.g., four P.M. to five P.M.), a before work mode (e.g., six A.M. to eight A.M., Monday through Friday), or a late evening mode (e.g., nine P.M. to 11:30 P.M). As described above, the mode of the user can be determined by one or more user actions, location, time of day, etc. In some implementations, the mode can be determined by evaluating the content request itself irrespective of the location or time of day. For example, a specific request for content as part of a search query may itself be indicative of the user's mode (e.g., vacation planning mode or a shopping mode).

In some implementations, the content management system 110 or server 215 may group usage information entries by user and by IP address and may associate a home mode or a work mode with each entry, based on a date and time stamp included in the entry. Each IP address may be geo-coded, such as to determine an approximate location associated with the IP address. In some implementations, multiple IP addresses included in a same block of IP addresses may be treated as being equivalent IP addresses for some or all processing. A time zone for the location associated with the IP address may be determined, and the timestamp may be adjusted to account for the time zone of the location associated with the IP address. As an example, an entry with a time zone-adjusted date and time stamp corresponding to two P.M. on a Wednesday may be associated with a work mode and an entry with a time zone-adjusted date and time stamp corresponding to eight P.M. on a Thursday may be associated with a home mode.

The content management system 110 or server 215 may determine, for each user, an IP address associated with the user that most corresponds to a work mode or to a home mode as compared to other IP addresses associated with the user. For example, the content management system 110 may determine, for each user, an entry count for each IP address and mode combination (e.g., IP1 I work, IP2 I work, IP1 I home, IP2 I home). The content management system 110 may determine, for each user and for each mode, the IP address associated with the highest number of entries. The IP address associated with the highest number of entries for a particular user and for a particular mode may be identified as the IP address associated with that mode, for the user.

For example, an IP address "IP1" may be identified as the IP address most associated with a work mode for the user (e.g., the "work IP address") and an IP address "IP2" may be identified as the IP address most associated with a home mode for the user (e.g., the "home IP address"). A user's home or work location may be approximated by geo-coding the home IP address or work IP address, respectively.

A user's home or work location may be determined by other approaches. For example, attributes of usage information other than time of day may be evaluated. For example, web sites visited, other requests for content, interactions with content, search keywords used, and other usage information may be evaluated, along with IP address information associated with the usage information, to determine whether usage performed using a particular IP address may be classified as usage associated with a work user or a home user. For example, a user's usage may indicate that the user works during second shift and is home during first shift. In such an example, a user's home location and a work address associated with the user can be approximated by geo-coding IP addresses corresponding to home-related usage and work-related usage, respectively.

Targeting information may be developed, for each user, for each mode associated with the user, where the targeting information may be different for the user for each mode. Targeting information may be developed, for example, by the content management system 110 or the server 215, for each user, for each mode, based on usage information. For example, for a particular user, work-related targeting information may be developed from usage information associated with a work mode and home-related targeting information may be developed from usage information associated with a home mode.

In general, targeting information may be developed, for each user and for each mode, based on historical user activities of the user when in the respective mode. For example, search keywords used, particular content interacted with, sites visited by the user, etc., may be used to develop targeting information. Targeting information for a user for a particular mode can indicate concepts associated with that mode or concepts that the user is interested in while in that mode. Targeting information for a user for a particular mode can include user-specific targeting information and targeting information that is generally associated with the mode for most, all, or a subset of users.

Targeting information may be based on a location associated with a respective mode. For example, targeting information may be specific to a work mode in New York City or to a home mode in Minneapolis, Minn. As another example and as described in more detail below, it may be detected that a user is traveling or is planning on traveling. Usage information may be classified as being related to a travel mode, and targeting information may be developed, for users who have travel-related usage, for the travel mode.

Continuing with FIG. 3, a request to deliver content to the user is received, the request including an identifier associated with the user and information to determine which mode of the plurality of modes the user is operating in (306). For example, the content management system 110 may receive a request for content from the user device 106. As another example, the server 215 may receive a request for content from the user device 204. The identifier may be, for example, a cookie received from a device that was used to provide the request by the user. The cookie may be stored on a user device associated with the user and the user device may be associated with one of the locations associated with the user. Information about the request for content may be stored as usage information for the user and may be used as a basis for targeting information to the user in the future.

In some implementations, a mode associated with the request may be determined based on information relating to a time of the request, the location of the request, or both. For example, a home mode may be determined if the location of the request matches a location associated with the home of the user and the request is received during a predetermined home-related time window during the day or night. As another example, a work mode may be determined if the location of the request matches a work location associated with the user and the request is received during a predetermined work-related time window during the day or night.

In some implementations, an away, or travel mode may be determined if, at the time of receipt of the request, the user is not at a work location or a home location associated with the user. For example, an IP address associated with the request may be different from both a home IP address or location and a work IP address or location associated with the user. For example, the IP address associated with the request can be geo-coded to determine a location associated with the request. If the location associated with the request is more than a predetermined number of miles (e.g., one hundred) from the user's home and work locations, then it may be determined that the user is traveling.

Content is provided to the user based on the mode and associated targeting information (308). For example, the content management system 110 may select one or more content items and may send the selected content items to a user device associated with the user. For example, selected content items can be sent to the user with content that the user requested. If the user is operating in a home, work, or away mode, the selected content items may be selected, for example, based on home-related, work-related, or travel-related targeting information, respectively.

Figure 4:
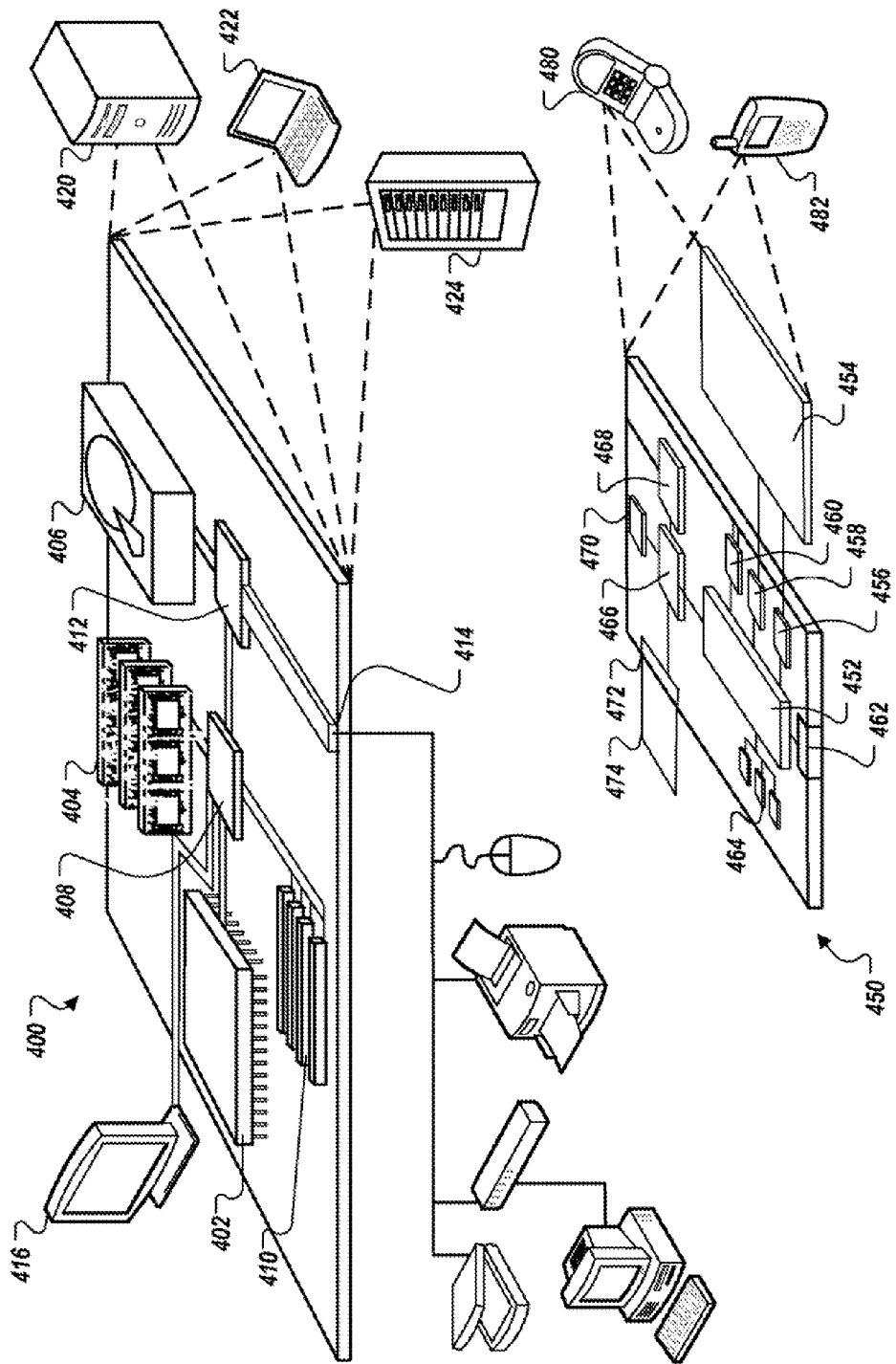
FIG. 4 is a block diagram of computing devices that may be used to implement the systems and methods described in this document, as either a client or as a server or plurality of servers.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communication audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method for providing content, comprising:
identifying, by one or more computing devices, a plurality of operating modes for a user computing device based on usage information generated for the user computing device over one or more periods of time, wherein the user computing device is distinct and separate from the one or more computing devices;
receiving, by the one or more computing devices, a request for content to display at the user computing device;
determining, by the one or more computing devices, in connection with receiving the request, that the user computing device is operating in at least one of the operating modes;
determining, by the one or more computing devices, user targeting information for the at least one of the operating modes based on one or more previous requests for content from the user computing device made when the user computing device was previously operating in the at least one of the operating modes, the targeting information associated with one or more previous content requests from the user computing device; and
providing, by the one or more computing devices, content for display at the user computing device based on the targeting information for the at least one of the operating modes.

2. The method of claim 1, wherein each operating mode is associated with one or more predetermined time ranges.

3. The method of claim 1, wherein each operating mode is associated with one or more predetermined locations.

4. The method of claim 3, wherein identifying the plurality of operating modes comprises:
identifying one or more network addresses in the usage information;
geocoding the one or more network addresses; and
determining one or more geographic locations for the computing device based on the geocoding.

5. The method of claim 1, wherein the usage information comprises a plurality of usage entries, and wherein identifying the plurality of operating modes comprises:

grouping the usage entries by geographic locations and a timestamp associated with each usage entry.

6. The method of claim 1, wherein the usage information comprises a plurality of usage entries, each usage entry associated with a network address, the method further comprising:
for each of the plurality of modes, identifying a network address associated with the highest number of entries in the usage information for the mode; and
determining that the computing device is operating in a respective operating mode by determining that the computing device is currently associated with a network address associated with the highest number of entries in the usage information for the respective operating mode.

7. The method of claim 1, wherein the usage information comprises historical activities of a user while in the at least one of the operating modes, the targeting information being based on the historical activities.

8. The method of claim 1, wherein determining user targeting information comprises determining a topic of interest for a user of the computing device while the computing device is operating in the at least one of the operating modes, the content provided for display being related to the topic of interest.

9. The method of claim 1, wherein determining that the computing device is operating in at least one of the operating modes comprises:
identifying a network address for the computing device; and
determining that the network address is different than one or more network addresses previously associated with one or more of the operation modes.

10. A computer program product tangibly embodied in a computer-readable storage device and comprising instructions that, when executed by a computing device, cause the computing device to:
identify a plurality of operating modes for a computing device based on usage information generated for the computing device over one or more periods of time;
receive a request for content to display at the computing device;
determine, in connection with receiving the request, that the computing device is operating in at least one of the operating modes;
determine user targeting information for the at least one of the operating modes based on one or more previous requests for content from the computing device made when the computing device was previously operating in the at least one of the operating modes, the targeting information associated with one or more previous content requests from the computing device; and
provide content for display at the computing device based on the targeting information for the at least one of the operating modes.

11. The computer program product of claim 10, wherein each operating mode is associated with one or more predetermined time ranges.

12. The computer program product of claim 10, wherein each operating mode is associated with one or more predetermined locations.

13. The computer program product of claim 12, wherein identifying the plurality of operating modes comprises:
identifying one or more network addresses in the usage information;
geocoding the one or more network addresses; and
determining one or more geographic locations for the computing device based on the geocoding.

14. The computer program product of claim 10, wherein determining user targeting information comprises determining a topic of interest for a user of the computing device while the computing device is operating in the at least one of the operating modes, the content provided for display being related to the topic of interest.

15. The computer program product of claim 10, wherein determining that the computing device is operating in at least one of the operating modes comprises:
identifying a network address for the computing device; and
determining that the network address is different than one or more network addresses previously associated with one or more of the operation modes.

16. A system for providing content to a user, comprising:
one or more computing devices configured to:
identify a plurality of operating modes for a user based on usage information generated for the user over one or more periods of time;
receive a request for content to display to the user, the request identifying the user;
determine, in connection with receiving the request, that the user is operating a user computing device in at least one of the operating modes;
determine user targeting information for the at least one of the operating modes and the user based on one or more previous requests for content from the user computing device made when the user computing device was previously operating in the at least one of the operating modes, the targeting information associated with one or more previous content requests from the user computing device; and
provide content for display to the user based on the targeting information for the at least one of the operating modes.

17. The system of claim 16, wherein each operating mode is associated with one or more predetermined locations and one or more predetermined time ranges.

18. The system of claim 16, wherein the usage information comprises a plurality of usage entries, and wherein the one or more computing device are further configured to:
group the usage entries by geographic locations and a timestamp associated with each usage entry.

19. The system of claim 16, wherein the usage information comprises a plurality of usage entries, each usage entry associated with a network address, wherein the one or more computing devices are further configured to:
for each of the plurality of modes, identify a network address associated with the highest number of entries in the usage information for the mode; and
determine that the user is operating the user computing device in a respective operating mode by determining that the user computing device is currently associated with the network address associated with the highest number of entries in the usage information for the respective operating mode.

20. The system of claim 16, wherein the usage information comprises historical activities of the user while in the at least one of the operating modes, the targeting information being based on the historical activities.

* * * * *